(12) United States Patent
Li et al.

(10) Patent No.: US 12,294,293 B2
(45) Date of Patent: May 6, 2025

(54) CONTROL METHOD AND CIRCUIT FOR TWO-STAGE CURRENT LIMITING OF PEAK POWER CURRENT

(71) Applicant: WUXI SI-POWER MICRO-ELECTRONICS CO., LTD., Jiangsu (CN)

(72) Inventors: Ye Li, Jiangsu (CN); Haodan Huang, Jiangsu (CN)

(73) Assignee: WUXI SI-POWER MICRO-ELECTRONICS CO., LTD., Jiangsu (CN)

(*) Notice: Subject to any disclaimer, the term of this patent is extended or adjusted under 35 U.S.C. 154(b) by 0 days.

(21) Appl. No.: 18/709,819

(22) PCT Filed: Jan. 23, 2024

(86) PCT No.: PCT/CN2024/073540
§ 371 (c)(1),
(2) Date: May 14, 2024

(87) PCT Pub. No.: WO2024/244503
PCT Pub. Date: Dec. 5, 2024

(65) Prior Publication Data
US 2024/0421697 A1    Dec. 19, 2024

(51) Int. Cl.
*H02M 1/32*   (2007.01)
*H02M 3/335*  (2006.01)

(52) U.S. Cl.
CPC ......... *H02M 1/32* (2013.01); *H02M 3/33507* (2013.01)

(58) Field of Classification Search
CPC .......................... H02M 1/32; H02M 3/33507
See application file for complete search history.

(56) References Cited

U.S. PATENT DOCUMENTS

| 6,631,064 B2* | 10/2003 | Schuellein | H02H 7/1213 |
| | | | 361/93.1 |
| 11,909,322 B2* | 2/2024 | Li | H02M 1/44 |
| 2007/0285077 A1 | 12/2007 | Hasegawa | |
| 2008/0259650 A1 | 10/2008 | Huynh et al. | |
| 2012/0281444 A1* | 11/2012 | Dent | H02J 3/388 |
| | | | 363/131 |

(Continued)

FOREIGN PATENT DOCUMENTS

| CN | 106992686 A | 7/2017 |
| CN | 114448223 A | 5/2022 |

(Continued)

*Primary Examiner* — Kyle J Moody
(74) *Attorney, Agent, or Firm* — Yue (Robert) Xu; Apex Attorneys at Law, LLP

(57) ABSTRACT

A control method and circuit for two-stage current limiting of peak power current are disclosed. The method includes detecting a load current of a power supply system; judging a load current interval of the power supply system; when the load current of the power supply system is less than the rated power current, enabling the system to work in a constant voltage mode; and when the load current of the power supply system is greater than the rated power current, enabling the system to work in a peak power mode; and when the load current of the power supply system is greater than the peak power current, starting a protection program.

8 Claims, 3 Drawing Sheets

(56) References Cited

U.S. PATENT DOCUMENTS

| | | | | |
|---|---|---|---|---|
| 2014/0198537 A1* | 7/2014 | Kimura | ............... | H02M 1/44 363/17 |
| 2014/0226368 A1* | 8/2014 | Kimura | ............ | H02M 3/33507 363/21.09 |
| 2020/0177085 A1* | 6/2020 | Mizoe | ............... | H02M 3/33523 |

FOREIGN PATENT DOCUMENTS

| | | |
|---|---|---|
| CN | 114531008 A | 5/2022 |
| CN | 114552962 A | 5/2022 |
| CN | 218788726 U | 4/2023 |

\* cited by examiner

CONTROL METHOD AND CIRCUIT FOR TWO-STAGE CURRENT LIMITING OF PEAK POWER CURRENT

This application is the national phase of International Application No. PCT/CN2024/073540, titled "CONTROL METHOD AND CIRCUIT FOR TWO-STAGE CURRENT LIMITING OF PEAK POWER CURRENT", filed on Jan. 23, 2024, which claims the priority to Chinese Patent Application No. 202310602260.5, titled "CONTROL METHOD AND CIRCUIT FOR TWO-STAGE CURRENT LIMITING OF PEAK POWER CURRENT", filed on May 26, 2023 with the Chinese Patent Office, both of which are incorporated herein by reference in their entireties.

TECHNICAL FIELD

The present disclosure relates to the technical field of switching power supply control, in particular to a control method and circuit for two-stage current limiting of peak power current.

BACKGROUND

Peak power refers to the power more than 50% of the maximum rated output power that the power supply can output in a short time, and usually only needs to last for tens of milliseconds to several seconds. This technology may be applied to electronic products such as routers, smart speakers, cameras, printers and the like in which the load changes instantaneously, and can greatly reduce the cost of the power supply.

At present, the power converter with peak power function mainly adopts the flyback architecture with secondary side feedback, which needs to be added with 431 (controllable precision voltage regulator), optocoupler and other components for control, and the power supply system cost is relatively high. Although the flyback switching power supply using primary side feedback is technically difficult, the system cost has obvious advantages, and the peak power demand of primary side feedback is urgent and needs to be improved.

SUMMARY

An object of the present disclosure is to provide a control method and circuit for two-stage current limiting of peak power current to solve the problems set forth in the above background.

In order to achieve the above object, the present disclosure provides the following technical solutions:
a control method for two-stage current limiting of peak power current includes the following steps:
Step 1, detecting a load current of a power supply system;
Step 2, judging a load current interval of the power supply system;
Step 3, enabling the system to work in a constant voltage mode when the load current of the power supply system is less than a rated power current; and enabling the system to work in a peak power mode when the load current of the power supply system is greater than the rated power current; and
Step 4, starting a protection program when the load current of the power supply system is continuously greater than the rated power current; wherein
Step 4 includes:
Step 41, enabling a first constant current loop to intervene and start a first overcurrent timer when the load current of the power supply system is greater than the rated power current and less than the peak power current, enabling the power supply system to stop working and be restarted when the load current is continuously greater than the rated power current and less than the peak power current for more than 1 second, and enabling the first constant current loop to exit and clear the first overcurrent timer if the load current is less than the rated power current during this period; and
Step 42, enabling a second constant current loop to intervene and start a second overcurrent timer when the load current of the power supply system is greater than the peak power current, enabling the power supply system to stop working and be restarted when the load current is continuously greater than the peak power current for more than 20 milliseconds, and enabling the second constant current loop to exit and clear the second overcurrent timer if the load current is less than the peak power current during this period.

As a further aspect of the present disclosure, when the system works in the constant voltage mode, the maximum switching frequency of the system is $FS=F\_max$; when the system works in the peak power mode, the maximum switching frequency of the system is $FS=F\_pk$; where $F\_pk=n*F\_max$, and the parameter n is in the range of 1.5-2.

A control circuit for two-stage current limiting of peak power current is applied to the control method for two-stage current limiting of peak power current described above, and includes:
a switching power supply control unit 100, configured to control switching of a power transistor 140 through a sampling voltage on a sampling resistor 141 and a feedback voltage of an output feedback module 120;
the power transistor 140, configured to control, when turned on, a transformer 110 to store energy;
the transformer 110, configured to transfer energy for isolating primary and secondary;
an output rectifying and filtering module 130, configured to filter and store the energy transferred from the primary; and
the output feedback module 120, configured to feed back an output signal to the switching power supply control unit 100 through an auxiliary winding; wherein
an output port of the switching power supply control unit 100 is connected to a gate of the power transistor 140, a drain of the power transistor 140 is connected to one terminal of an input terminal of the transformer 110, a source of the power transistor 140 is grounded through the sampling resistor 141, the source of the power transistor 140 is connected to a first input port of the switching power supply control unit 100, the other terminal of the input port of the transformer 110 is connected to an input voltage VIN, a first output port of the transformer 110 is connected to an input port of the output rectifying and filtering module 130, a second output port of the transformer 110 is connected to an input port of the output feedback module 120, and an output port of the output feedback module 120 is connected to a second input port of the switching power supply control unit 100.

As a still further aspect of the present disclosure, the switching power supply control unit 100 includes a power transistor turn-on trigger signal and frequency regulation control module 150, a constant current control module 151, a turn-off trigger signal comparator 154, an RS flip-flop 155, a driving module 156, a first OR gate 157, and a second OR gate 158, wherein a first terminal of the power transistor turn-on trigger signal and frequency regulation control module 150 is connected to a reference voltage Vref, a second terminal of the power transistor turn-on trigger signal and frequency regulation control module 150 is connected to the output port of the output feedback module 120, a third terminal of the power transistor turn-on trigger signal and frequency regulation control module 150 is connected to a first terminal of the constant current control module 151, a fourth terminal of the power transistor turn-on trigger signal and frequency regulation control module 150 is connected to an S terminal of the RS flip-flop 155, a second terminal of the constant current control module 151 is connected to a non-inverting terminal of the turn-off trigger signal comparator 154 and the source of the power transistor 140, a third terminal of the constant current control module 151 is connected to an inverting terminal of the turn-off trigger signal comparator 154, an output port of the turn-off trigger signal comparator 154 is connected to one terminal of an input port of the first OR gate 157, an output port of the first OR gate 157 is connected to an R terminal of the RS flip-flop 155, the other terminal of the input port of the first OR gate 157 is connected to an output port of the second OR gate 158, one terminal of an input port of the second OR gate 158 is connected to a fourth terminal of the constant current control module 151, the other terminal of the input port of the second OR gate 158 is connected to a fifth terminal of the constant current control module 151, a Q terminal of the RS flip-flop 155 is connected to an input terminal of the driving module 156, and an output port of the driving module 156 is connected to the gate of the power transistor 140.

As a still further aspect of the present disclosure, the constant current control module 151 includes a voltage dividing unit 210, a first selector 220, a second selector 230, an average current calculating unit 240, a first timer 250, a second timer 260, an operational amplifier OP1, an operational amplifier OP2, a comparator CMP1, a comparator CMP2, a capacitor C1, and a capacitor C2, wherein an output port of the voltage dividing unit 210 is connected to one terminal of an input port of the first selector 220, the other terminal of the input port of the first selector 220 is connected to a reference voltage VCS_min, an output port of the first selector 220 is connected to a non-inverting terminal of the comparator CMP1, a non-inverting terminal of the comparator CMP2 and a first terminal of an input port of the second selector 230, a second terminal of the input port of the second selector 230 is connected to a reference voltage VCS_max, a third terminal of the input port of the second selector 230 is connected to an inverting terminal of the comparator CMP2, one terminal of the capacitor C2, and an output port of the operational amplifier OP2, the other terminal of the capacitor C2 is grounded, a non-inverting terminal of the operational amplifier OP2 is connected to a reference voltage $Vref_{CC2}$, an inverting terminal of the operational amplifier OP2 is connected to an output port of the average current calculating unit 240 and an inverting terminal of the operational amplifier OP1, a non-inverting terminal of the operational amplifier OP1 is connected to a reference voltage $Vref_{CC1}$, an output port of the operational amplifier OP1 is connected to one terminal of the capacitor C1 and an inverting terminal of the comparator CMP1, the other terminal of the capacitor C1 is grounded, an output port of the comparator CMP1 is connected to an input port of the second timer 260, an input port of the voltage dividing unit 210 is the first terminal of the constant current control module 151, an input port of the average current calculating unit 240 is the second terminal of the constant current control module 151, an output port of the second selector 230 is the third terminal of the constant current control module 151, an output port of the second timer 260 is the fourth terminal of the constant current control module 151, an output port of the first timer 250 is the fifth terminal of the constant current control module 151, and an output port of the comparator CMP2 is connected to an input port of the first timer 250.

As a further aspect of the present disclosure, the output feedback module 120 includes a resistor R1 and a resistor R2, wherein one terminal of the resistor R1 is connected to one terminal of the second output port of the transformer 110, the other terminal of the resistor R1 is connected to the resistor R2 and the second input port of the switching power supply control unit 100, and the other terminal of the resistor R2 is grounded.

Compared with the prior art, the present disclosure has the beneficial effects that a primary side feedback flyback architecture is adopted, a function of two-stage current limiting of peak power current is designed, precise two-stage current limiting for the rated power current and the peak power current is realized, the product reliability and the peak current consistency are improved, and the system cost is further reduced.

In the figures: 100—switching power supply control unit, 110—transformer, 120—output feedback module, 130—output rectifying and filtering module, 140—power transistor, 141—sampling resistor, 150—power transistor turn—on trigger signal and frequency regulation control module, 151—constant current control module, 154—turn—off trigger signal comparator, 155—RS flip—flop, 156—driving module, 157—first OR gate, 158—second OR gate, 210—voltage dividing unit, 220—first selector, 230—second selector, 240—average current calculating unit, 250—first timer, and 260—second timer.

DETAILED DESCRIPTION

The technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments, and based on the embodiments in the present disclosure, all other embodiments obtained by a person having ordinary skill in the art without making inventive labor belong to the scope of protection of the present disclosure.

Figure 1:
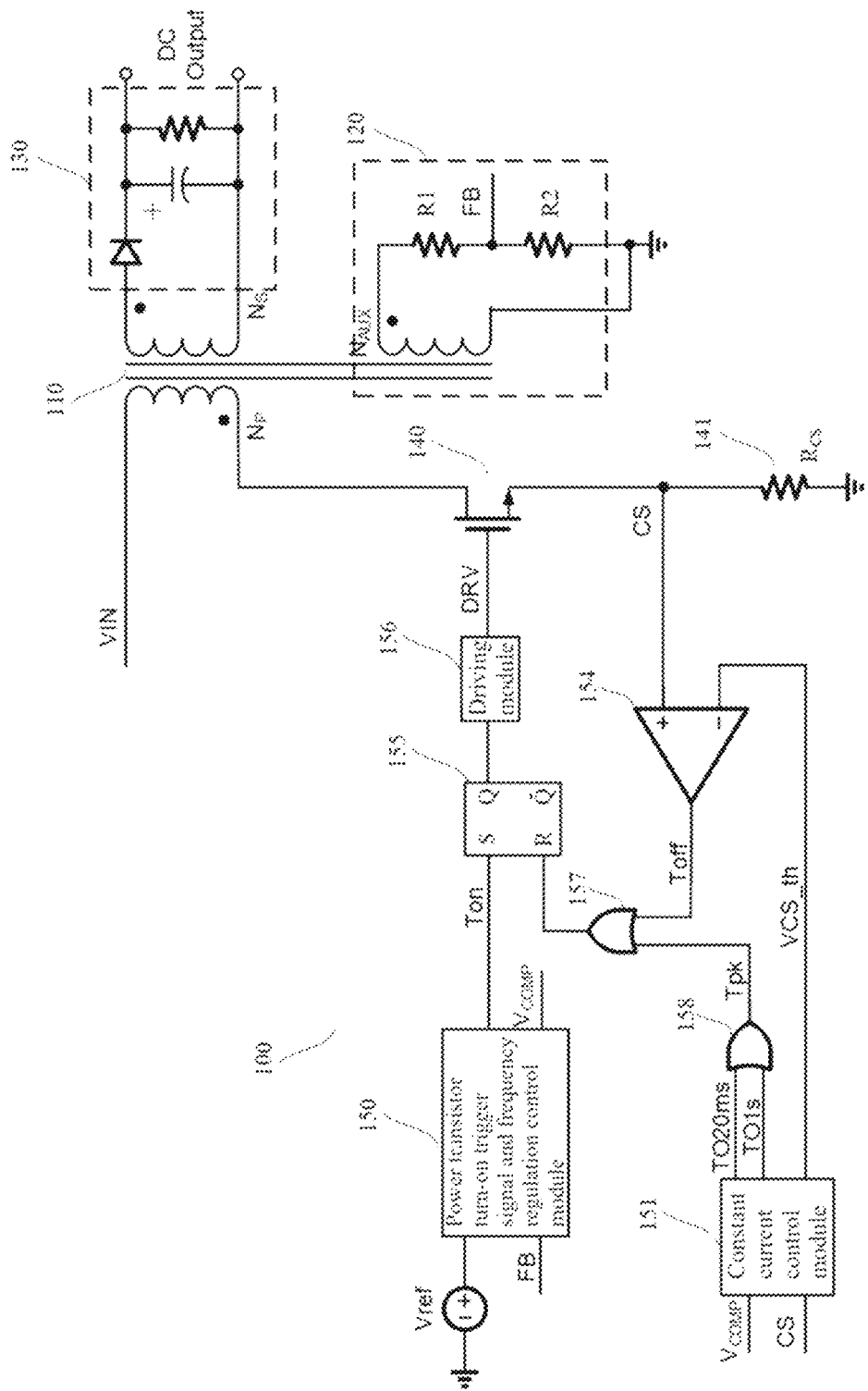
FIG. 1 is a control schematic diagram of a power conversion system according to an embodiment of the present disclosure.
Figure 2:
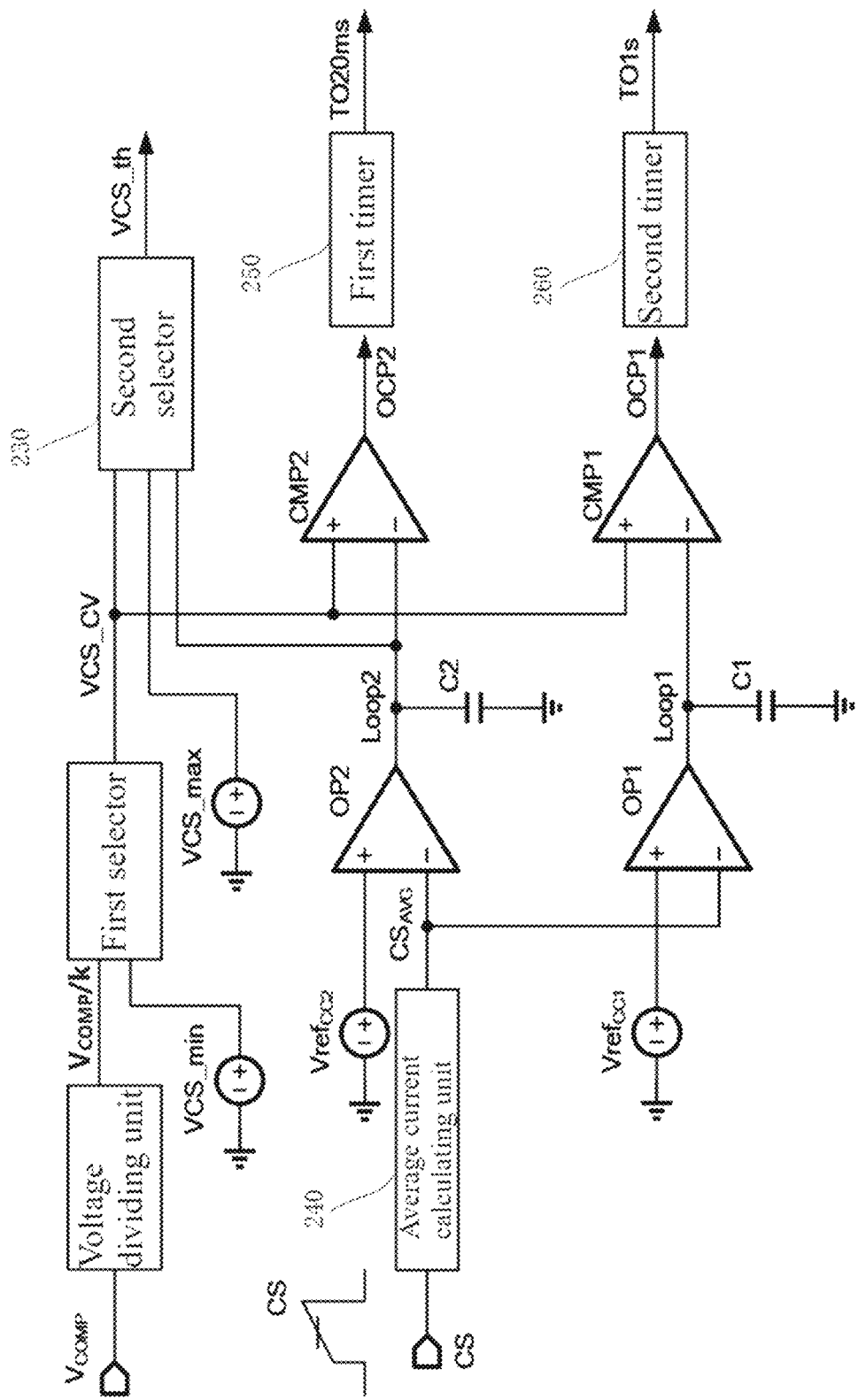
FIG. 2 is a control block diagram of two-stage current limiting of peak power current according to an embodiment of the present disclosure.
Figure 3:
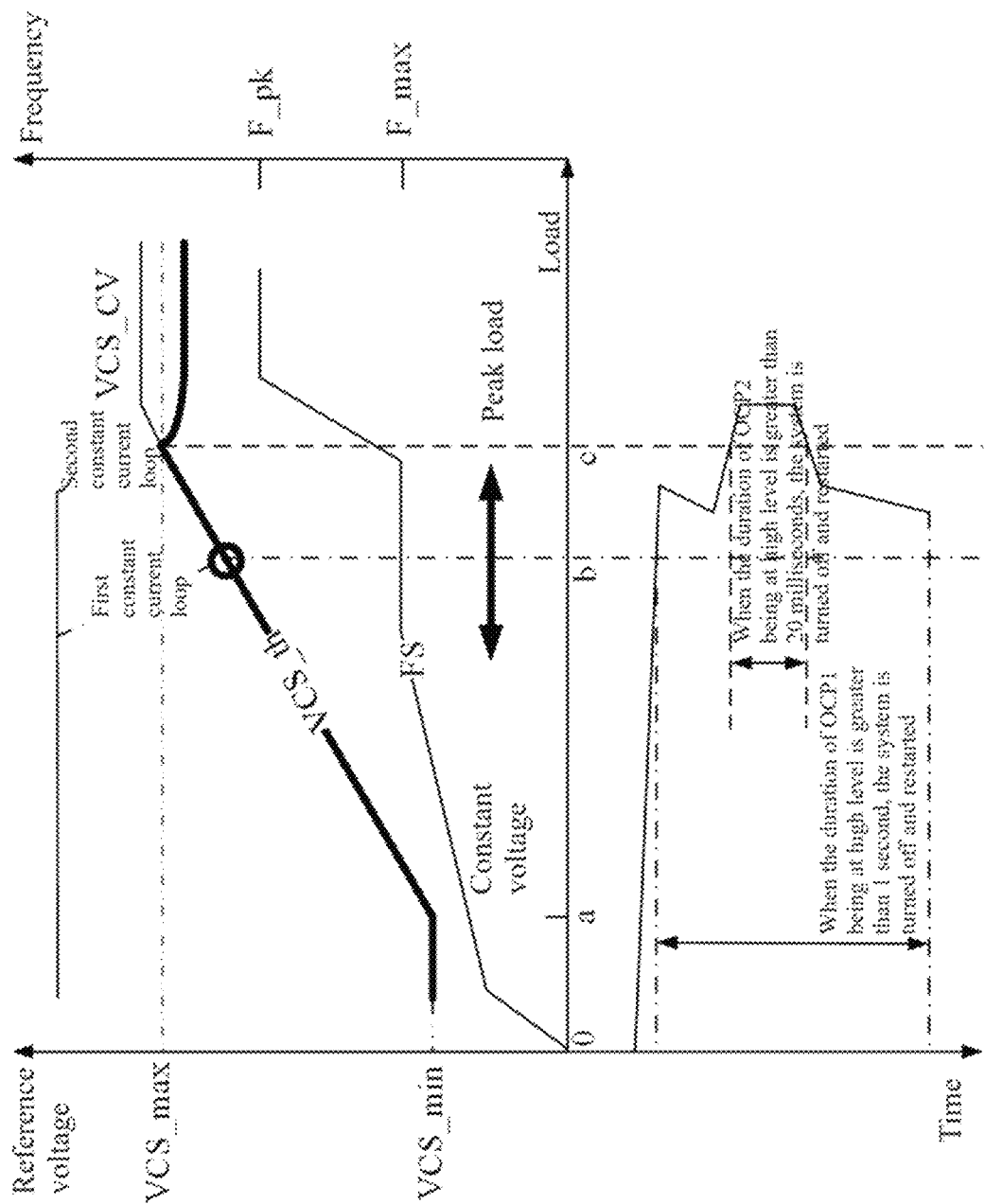
FIG. 3 is a control signal schematic diagram of two-stage current limiting of peak power current according to an embodiment of the present disclosure.

Referring to FIG. 1 to FIG. 3, a control method for two-stage current limiting of peak power current includes the following steps:

Step 1, detecting the load current of a power supply system (obtained by a sampling voltage on a sampling resistor 141);

Step 2, judging a load current interval of the power supply system;

Step 3, enabling the system to work in a constant voltage mode when the load current of the power supply system is less than a rated power current; and enabling the system to work in a peak power mode when the load current of the power supply system is greater than the rated power current; and Step 4, starting a protection program when the load current of the power supply system is continuously greater than the rated power current; wherein Step 4 includes:

Step 41, enabling a first constant current loop to intervene and start a first overcurrent timer when the load current of the power supply system is greater than the rated power current and less than the peak power current, enabling the power supply system to stop working and be restarted when the load current is continuously greater than the rated power current and less than the peak power current for more than 1 second, and enabling the first constant current loop to exit and clear the first overcurrent timer if the load current is less than the rated power current during this period; and Step 42, enabling a second constant current loop to intervene and start a second overcurrent timer when the load current of the power supply system is greater than the peak power current, enabling the power supply system to stop working and be restarted when the load current is continuously greater than the peak power current for more than 20 milliseconds, and enabling the second constant current loop to exit and clear the second overcurrent timer if the load current is less than the peak power current during this period.

In this embodiment, referring to FIGS. 2 and 3, when the system works in the constant voltage mode, the maximum switching frequency of the system is FS=F_max; when the system works in the peak power mode, the maximum switching frequency of the system is FS=F_pk; where F_pk=n*F_max, and the parameter n is in the range of 1.5-2.

In FIG. 3, the abscissa corresponds to the magnitude of the load current, the upper left coordinate corresponds to the voltage drop of the sampling resistor 141, the upper right coordinate corresponds to the switching frequency, and the lower left coordinate corresponds to the timing time;

when the system has a small load current or is in no-load operation, the $CS_{AVG}$ voltages in FIG. 2 are both less than $Vref_{CC1}$ and $Vref_{CC2}$, the outputs of Loop1 of the operational amplifier OP1 and Loop2 of the operational amplifier OP2 are both high; $V_{COMP}/k$ is also less than VCS_min, and the VCS_th voltage is determined by VCS_min, corresponding to 0-a in FIG. 3;

as the system load gradually increases, $V_{COMP}$ gradually becomes larger, and when $V_{COMP}/k$ is also greater than VCS_min, the VCS_th voltage is determined by $V_{COMP}/k$, corresponding to a-b in FIG. 3;

as the load current approaches the rated current, $CS_{AVG}$ gradually becomes larger, Loop1 starts to drop;

when the load current is greater than or equal to the rated current, Loop1 in FIG. 2 is less than VCS_CV, OCP1 output by the comparator CMP1 is at high level, and when the duration of the OCP1 being at high level is greater than 1 second, the system is turned off and restarted, corresponding to b-c in FIG. 3;

when the load current is greater than or equal to the peak current, Loop2 in FIG. 2 is also less than VCS_CV, OCP2 output by the comparator CMP2 is at high level, and when the duration of the OCP2 being at high level is greater than 20 milliseconds, the system is turned off and restarted, corresponding to portion from c to end in FIG. 3;

in addition, after Loop2 intervenes, the VCS_th voltage is controlled by Loop2, thus limiting the maximum output current of the system, and ensuring the current limiting accuracy and the system reliability.

Loop1 corresponds to the first constant current loop, and is used to define the rated output current value, the first constant current loop is constituted by the operational amplifier OP1 and the integrating capacitor C1, in the adjusting process of the first constant current loop, the average current $CS_{AVG}$ gradually increases, Loop1 gradually starts to drop, and when the levels of the non-inverting terminal and the inverting terminal of the operational amplifier OP1 are equal, the output average current corresponds to the reference voltage $Vref_{CC1}$, i.e., the rated output current value is set by $Vref_{CC1}$; at the same time, OCP1 output by the comparator CMP1 is at high level, the second timer 260 performs timing, and if the duration of OCP1 being at high level exceeds 1 second, the system stops switching and is restarted.

Loop2 corresponds to the second constant current loop, and is used to define the peak output current value, the second constant current loop is constituted by the operational amplifier OP2 and the integrating capacitor C2, in the adjusting process of the second constant current loop, the average current $CS_{AVG}$ continues to increase, Loop2 also gradually starts to drop, and the levels of the non-inverting terminal and the inverting terminal of the operational amplifier OP2 are equal, i.e., the output average current corresponds to the reference voltage $Vref_{CC2}$, and the peak output current value is set by $Vref_{CC2}$; at the same time, OCP2 output by the comparator CMP2 is at high level, the first timer 250 performs timing, and if the duration of OCP2 being at high level exceeds 20 milliseconds, the system stops switching and is restarted.

The two constant current loop methods enable the system to work normally under the condition of exceeding the rated output current for a short time, for example, a power supply system with the rated output power of 18 W (12V/1.5 A) can work normally at peak power of 24 W (12V/2A) or even higher for a short time. The two constant current loops can accurately control the rated current and the peak current, respectively, thus improving the reliability of the power supply system, and greatly reducing the system cost.

In this embodiment, referring to FIG. 1, a control circuit for two-stage current limiting of peak power current is applied to the control method for two-stage current limiting of peak power current as described above, and includes:

a switching power supply control unit 100, configured to control switching of a power transistor 140 through a sampling voltage on a sampling resistor 141 and a feedback voltage of an output feedback module 120;

the power transistor 140, configured to control, when turned on, a transformer 110 to store energy;

the transformer 110, configured to transfer energy for isolating primary and secondary;

an output rectifying and filtering module 130, configured to filter and store the energy transferred from the primary; and an output feedback module 120, configured to feed back an output signal to the switching power supply control unit 100 through an auxiliary winding; wherein an output port of the switching power supply control unit 100 is connected to a gate of the power transistor 140, a drain of the power transistor 140 is connected to one terminal of an input port of the transformer 110, a source of the power transistor 140 is grounded through the sampling resistor 141, the source of the power transistor 140 is connected to a first input port of the switching power supply control unit 100, the other terminal of the input port of the transformer 110 is connected to an input voltage VIN, a first output port of the transformer 110 is connected to an input port of the output rectifying and filtering module 130, a second output port of the transformer 110 is connected to an input port of the output feedback module 120, and an output port of the output feedback module 120 is connected to a second input port of the switching power supply control unit 100.

The switching power supply control unit 100 controls the magnitudes of the final output voltage and current of the output rectifying and filtering module 130 by controlling the turn-on frequency of the power transistor 140 to realize precise two-stage current limiting for the rated power current and the peak power current.

In this embodiment, referring to FIG. 1, the switching power supply control unit 100 includes a power transistor turn-on trigger signal and frequency regulation control module 150, a constant current control module 151, a turn-off trigger signal comparator 154, an RS flip-flop 155, a driving module 156, a first OR gate 157, and a second OR gate 158, wherein a first terminal of the power transistor turn-on trigger signal and frequency regulation control module 150 is connected to a reference voltage Vref, a second terminal of the power transistor turn-on trigger signal and frequency regulation control module 150 is connected to the output port of the output feedback module 120, a third terminal of the power transistor turn-on trigger signal and frequency regulation control module 150 is connected to a first terminal of the constant current control module 151, a fourth terminal of the power transistor turn-on trigger signal and frequency regulation control module 150 is connected to an S terminal of the RS flip-flop 155, a second terminal of the constant current control module 151 is connected to a non-inverting terminal of the turn-off trigger signal comparator 154 and the source of the power transistor 140, a third terminal of the constant current control module 151 is connected to an inverting terminal of the turn-off trigger signal comparator 154, an output port of the turn-off trigger signal comparator 154 is connected to one terminal of an input port of the first OR gate 157, an output port of the first OR gate 157 is connected to an R terminal of the RS flip-flop 155, the other terminal of the input port of the first OR gate 157 is connected to an output port of the second OR gate 158, one terminal of an input port of the second OR gate 158 is connected to a fourth terminal of the constant current control module 151, the other terminal of the input port of the second OR gate 158 is connected to a fifth terminal of the constant current control module 151, a Q terminal of the RS flip-flop 155 is connected to an input port of the driving module 156, and an output port of the driving module 156 is connected to the gate of the power transistor 140.

An auxiliary winding voltage division feedback signal FB is connected to the power transistor turn-on trigger signal and frequency regulation control module 150 of the switching power supply control unit 100; the module 150 samples and holds the feedback signal FB and performs error amplification with reference voltage Vref to generate a $V_{COMP}$ signal; the $V_{COMP}$ signal is compared with an internal exponential sawtooth signal to generate a power transistor turn-on control signal Ton, which is sent to a set terminal of the RS flip-flop 155. After a Q-terminal signal of the RS flip-flop is amplified by the driving module 156, a DRV signal is output and connected to a driving pin of the power transistor 140.

The switching frequency of the power transistor 140 is related to the magnitude of the $V_{COMP}$ value, and the greater the $V_{COMP}$ value, the higher the switching frequency;

a turn-off signal of the power transistor 140 is jointly controlled by the turn-off trigger signal comparator 154 and the constant current control module 151 (the turn-off signal of the power transistor 140 is controlled by controlling whether the RS flip-flop 155 is turned on or not);

the turn-off trigger signal comparator 154 generates a cycle-by-cycle turn-off signal Toff by comparing a CS signal with a current threshold voltage signal VCS_th;

the constant current control module 151 generates a timing signal TO1$s$ of the first constant current loop and a timing signal TO20$ms$ of the second constant current loop, and after the TO1$s$ and TO20$ms$ are combined with the Toff signal, the combined signal is sent to the R terminal of the RS flip-flop 155 to turn off the power transistor 140.

When the load current of the power supply system is less than the rated power current, the system works in the constant voltage mode, and the timing signals TO1$s$ and TO20$ms$ are both at a low level, so that the turn-off of the power transistor is controlled only by the Toff signal;

when the load current of the power supply system is greater than the rated power current, the system works in the peak power mode, and when the timing signals TO1$s$ and TO20$ms$ change from low to high, the turn-off of the power transistor is also controlled only by the Toff signal; when either of the timing signals TO1$s$ and TO20$ms$ is at high level, the RS flip-flop 155 is always in a reset state, the power transistor 140 stops the switching action, and the system needs to be restarted to resume work.

In this embodiment, referring to FIG. 2, the constant current control module 151 includes a voltage dividing unit 210, a first selector 220, a second selector 230, an average current calculating unit 240, a first timer 250, a second timer 260, an operational amplifier OP1, an operational amplifier OP2, a comparator CMP1, a comparator CMP2, a capacitor C1, and a capacitor C2, wherein an output port of the voltage dividing unit 210 is connected to one terminal of an input port of the first selector 220, the other terminal of the input port of the first selector 220 is connected to a reference voltage VCS_min, an output port of the first selector 220 is connected to a non-inverting terminal of the comparator CMP1, a non-inverting terminal of the comparator CMP2 and a first terminal of an input port of the second selector 230, a second terminal of the input port of the second selector 230 is connected to a reference voltage VCS_max, a third terminal of the input port of the second selector 230 is connected to an inverting terminal of the comparator CMP2, one terminal of the capacitor C2, and an output port of the operational amplifier OP2, the other terminal of the capacitor C2 is grounded, a non-inverting terminal of the operational amplifier OP2 is connected to a reference voltage $Vref_{CC2}$, an inverting terminal of the operational amplifier OP2 is connected to an output port of the average current calculating unit 240 and an inverting terminal of the operational amplifier OP1, a non-inverting terminal of the operational amplifier OP1 is connected to a reference voltage $Vref_{CC1}$, an output port of the operational amplifier OP1 is connected to one terminal of the capacitor C1 and an inverting terminal of the comparator CMP1, the other terminal of the capacitor C1 is grounded, an output port of the comparator CMP1 is connected to an input port of the second timer 260, an input port of the voltage dividing unit 210 is the first terminal of the constant current control module 151, an input port of the average current calculating unit 240 is the second terminal of the constant current control module 151, an output port of the second selector 230 is the third terminal of the constant current control module 151, an output port of the second timer 260 is the fourth terminal of the constant current control module 151, an output port of the first timer 250 is the fifth terminal of the constant current control module 151, and an output port of the comparator CMP2 is connected to an input port of the first timer 250.

After the $V_{COMP}$ voltage is divided by the voltage dividing unit 210, a $V_{COMP}/k$ signal is output to the first selector 220, the first selector 220 selects the maximum value from $V_{COMP}/k$ and the reference voltage VCS_min, when $V_{COMP}/k$ is less than VCS_min, the output signal of the first selector 220 is VCS_min, and when $V_{COMP}/k$ is greater than VCS_min, the output signal of the first selector 220 is $V_{COMP}/k$;

the CS signal is input to the average current calculating unit 240, the unit samples a central value $VCS_{mid}$ of the CS cycle by cycle, and performs a multiplication operation with the demagnetization time Tdem and the switching cycle TS, and outputs an average current factor $CS_{AVG}$ to the inverting terminals of the operational amplifiers OP1 and OP2, the non-inverting terminals of the operational amplifiers OP1 and OP2 are connected to the reference voltages $Vref_{CC1}$ and $Vref_{CC2}$, respectively, corresponding to the constant current coefficients of the first and second constant current loops, and the output ports of the operational amplifiers OP1 and OP2 are connected to the integrating capacitors C1 and C2, respectively, to generate integration signals Loop1 and Loop2;

wherein $Vref_{CC1}$ is less than $Vref_{CC2}$, corresponding to the rated current and the peak current, respectively;

the integration signal Loop1 is connected to the negative terminal of the comparator CMP1, and is compared with the VCS_CV signal at the positive terminal, and when the output signal of the comparator CMP1 is zero, the second timer 260 is cleared, otherwise the second timer performs timing;

similarly, the integration signal Loop2 is connected to the negative terminal of the comparator CMP2, and is compared with the VCS_CV signal at the positive terminal, and when the output signal of the comparator CMP2 is zero, the first timer 250 is cleared, otherwise the first timer performs timing;

in addition, the integration signal Loop2 is also connected to the second selector 230 and is compared with VCS_CV and the reference voltage VCS_max, the minimum value among Loop2, VCS_CV and VCS_max is selected, and the VCS_th signal is output as a reference voltage of the turn-off trigger signal comparator 154.

In this embodiment, referring to FIG. 1, the output feedback module 120 includes a resistor R1 and a resistor R2, wherein one terminal of the resistor R1 is connected to one terminal of the second output port of the transformer 110, the other terminal of the resistor R1 is connected to the resistor R2 and the second input port of the switching power control unit 100, and the other terminal of the resistor R2 is grounded.

The voltage signal on the resistor R2 is obtained and output to the power transistor turn-on trigger signal and frequency regulation control module 150 to obtain the $V_{COMP}$ signal and the Ton signal.

The working principle of the present disclosure is that: the switching power supply control unit 100 is configured to control the switching of the power transistor 140 by the sampling voltage on the sampling resistor 141 and the feedback voltage of the output feedback module 120; the power transistor 140 is configured to control, when turned on, the transformer 110 to store energy; the transformer 110 is configured to transfer energy for isolating primary and secondary; the output rectifying and filtering module 130 is configured to filter and store the energy transferred from the primary; the output feedback module 120 is configured to feed back the output signal to the switching power supply control unit 100 through the auxiliary winding.

It is obvious to those skilled in the art that the present disclosure is not limited to the details of the above-mentioned exemplary embodiments, but may be realized in other specific forms without departing from the spirit or basic characteristics of the present disclosure. Therefore, the embodiments should be considered in all aspects as illustrative and not restrictive, and the scope of the present disclosure is defined by the appended claims rather than the above description, therefore, all variations falling within the meaning and scope of the equivalent elements of the claims are intended to be included in the present disclosure. Any reference signs in the claims shall not be construed as limiting the claim concerned.

In addition, it should be understood that although this description is described according to the embodiments, not each embodiment contains only one independent technical solution, the description manner in the description is for clarity only, and those skilled in the art should take the description as a whole, and the technical solutions in the embodiments may also be appropriately combined to form other embodiments that can be understood by those skilled in the art.

The invention claimed is:

1. A control method for two-stage current limiting of peak power current, comprising the following steps:
   Step 1, detecting a load current of a power supply system;
   Step 2, judging a load current interval of the power supply system;
   Step 3, enabling the power supply system to work in a constant voltage mode when the load current of the power supply system is less than a rated power current; and enabling the power supply system to work in a peak power mode when the load current of the power supply system is greater than the rated power current; and
   Step 4, starting a protection program when the load current of the power supply system is continuously greater than the rated power current; wherein
   Step 4 comprises:
   Step 41, enabling a first constant current loop to intervene and start a first overcurrent timer when the load current of the power supply system is greater than the rated power current and less than the peak power current, enabling the power supply system to stop working and be restarted when the load current is continuously greater than the rated power current and less than the peak power current for more than 1 second, and enabling the first constant current loop to exit and clear the first overcurrent timer if the load current is less than the rated power current during this period; and
   Step 42, enabling a second constant current loop to intervene and start a second overcurrent timer when the load current of the power supply system is greater than the peak power current, enabling the power supply system to stop working and be restarted when the load current is continuously greater than the peak power current for more than 20 milliseconds, and enabling the second constant current loop to exit and clear the second overcurrent timer if the load current is less than the peak power current during this period.

2. The control method for two-stage current limiting of peak power current according to claim 1, wherein when the power supply system works in the constant voltage mode, a maximum switching frequency of the power supply system is FS=F_max; when the power supply system works in the peak power mode, the maximum switching frequency of the power supply system is FS=F_pk; where F_pk=n*F_max, and the parameter n is in a range of 1.5-2.

3. A control circuit for two-stage current limiting of peak power current, applied to the control method for two-stage current limiting of peak power current according to claim 2, and comprising:

a switching power supply control unit (100), configured to control switching of a power transistor (140) through a sampling voltage on a sampling resistor (141) and a feedback voltage of an output feedback module (120);

the power transistor (140), configured to control, when turned on, a transformer (110) to store energy;

the transformer (110), configured to transfer energy for isolating a primary and a secondary;

an output rectifying and filtering module (130), configured to filter and store the energy transferred from the primary; and the output feedback module (120), configured to feed back an output signal to the switching power supply control unit (100) through an auxiliary winding;

wherein an output port of the switching power supply control unit (100) is connected to a gate of the power transistor (140), a drain of the power transistor (140) is connected to one terminal of an input port of the transformer (110), a source of the power transistor (140) is grounded through the sampling resistor (141), the source of the power transistor (140) is connected to a first input port of the switching power supply control unit (100), the other terminal of the input port of the transformer (110) is connected to an input voltage (VIN), a first output port of the transformer (110) is connected to an input port of the output rectifying and filtering module (130), a second output port of the transformer (110) is connected to an input port of the output feedback module (120), and an output port of the output feedback module (120) is connected to a second input port of the switching power supply control unit (100);

the switching power supply control unit (100) comprises a power transistor turn-on trigger signal and frequency regulation control module (150), a constant current control module (151), a turn-off trigger signal comparator (154), an RS flip-flop (155), a driving module (156), a first OR gate (157), and a second OR gate (158), wherein a first terminal of the power transistor turn-on trigger signal and frequency regulation control module (150) is connected to a reference voltage Vref, a second terminal of the power transistor turn-on trigger signal and frequency regulation control module (150) is connected to the output port of the output feedback module (120), a third terminal of the power transistor turn-on trigger signal and frequency regulation control module (150) is connected to a first terminal of the constant current control module (151), a fourth terminal of the power transistor turn-on trigger signal and frequency regulation control module (150) is connected to an S terminal of the RS flip-flop (155), a second terminal of the constant current control module (151) is connected to a non-inverting terminal of the turn-off trigger signal comparator (154) and the source of the power transistor (140), a third terminal of the constant current control module (151) is connected to an inverting terminal of the turn-off trigger signal comparator (154), an output port of the turn-off trigger signal comparator (154) is connected to one terminal of an input port of the first OR gate (157), an output port of the first OR gate (157) is connected to an R terminal of the RS flip-flop (155), the other terminal of the input port of the first OR gate (157) is connected to an output port of the second OR gate (158), one terminal of an input port of the second OR gate (158) is connected to a fourth terminal of the constant current control module (151), the other terminal of the input port of the second OR gate (158) is connected to a fifth terminal of the constant current control module (151), a Q terminal of the RS flip-flop (155) is connected to an input port of the driving module (156), and an output port of the driving module (156) is connected to the gate of the power transistor (140).

4. The control circuit for two-stage current limiting of peak power current according to claim 3, wherein the constant current control module (151) comprises a voltage dividing unit (210), a first selector (220), a second selector (230), an average current calculating unit (240), a first timer (250), a second timer (260), an operational amplifier OP1, an operational amplifier OP2, a comparator CMP1, a comparator CMP2, a capacitor C1, and a capacitor C2, wherein an output port of the voltage dividing unit (210) is connected to one terminal of an input port of the first selector (220), the other terminal of the input port of the first selector (220) is connected to a reference voltage VCS_min, an output port of the first selector (220) is connected to a non-inverting terminal of the comparator CMP1, a non-inverting terminal of the comparator CMP2 and a first terminal of an input port of the second selector (230), a second terminal of the input port of the second selector (230) is connected to a reference voltage VCS_max, a third terminal of the input port of the second selector (230) is connected to an inverting terminal of the comparator CMP2, one terminal of the capacitor C2 and an output port of the operational amplifier OP2, the other terminal of the capacitor C2 is grounded, a non-inverting terminal of the operational amplifier OP2 is connected to a reference voltage $Vref_{CC2}$, an inverting terminal of the operational amplifier OP2 is connected to an output port of the average current calculating unit (240) and an inverting terminal of the operational amplifier OP1, a non-inverting terminal of the operational amplifier OP1 is connected to a reference voltage $Vref_{CC1}$, an output port of the operational amplifier OP1 is connected to one terminal of the capacitor C1 and an inverting terminal of the comparator CMP1, the other terminal of the capacitor C1 is grounded, an output port of the comparator CMP1 is connected to an input port of the second timer (260), an input port of the voltage dividing unit (210) is the first terminal of the constant current control module (151), an input port of the average current calculating unit (240) is the second terminal of the constant current control module (151), an output port of the second selector (230) is the third terminal of the constant current control module (151), an output port of the second timer (260) is the fourth terminal of the constant current control module (151), an output port of the first timer (250) is the fifth terminal of the constant current control module (151), and an output port of the comparator CMP2 is connected to an input port of the first timer (250).

5. The control circuit for two-stage current limiting of peak power current according to claim 3, wherein the output feedback module (120) comprises a resistor R1 and a resistor R2, wherein one terminal of the resistor R1 is connected to one terminal of the second output port of the transformer (110), the other terminal of the resistor R1 is connected to the resistor R2 and the second input port of the switching power supply control unit (100), and the other terminal of the resistor R2 is grounded.

6. A control circuit for two-stage current limiting of peak power current, applied to the control method for two-stage current limiting of peak power current according to claim 1, and comprising:
a switching power supply control unit (100), configured to control switching of a power transistor (140) through a sampling voltage on a sampling resistor (141) and a feedback voltage of an output feedback module (120);
the power transistor (140), configured to control, when turned on, a transformer (110) to store energy;
the transformer (110), configured to transfer energy for isolating a primary and a secondary;
an output rectifying and filtering module (130), configured to filter and store the energy transferred from the primary; and
the output feedback module (120), configured to feed back an output signal to the switching power supply control unit (100) through an auxiliary winding; wherein
an output port of the switching power supply control unit (100) is connected to a gate of the power transistor (140), a drain of the power transistor (140) is connected to one terminal of an input port of the transformer (110), a source of the power transistor (140) is grounded through the sampling resistor (141), the source of the power transistor (140) is connected to a first input port of the switching power supply control unit (100), the other terminal of the input port of the transformer (110) is connected to an input voltage (VIN), a first output port of the transformer (110) is connected to an input port of the output rectifying and filtering module (130), a second output port of the transformer (110) is connected to an input port of the output feedback module (120), and an output port of the output feedback module (120) is connected to a second input port of the switching power supply control unit (100);
the switching power supply control unit (100) comprises a power transistor turn-on trigger signal and frequency regulation control module (150), a constant current control module (151), a turn-off trigger signal comparator (154), an RS flip-flop (155), a driving module (156), a first OR gate (157), and a second OR gate (158), wherein a first terminal of the power transistor turn-on trigger signal and frequency regulation control module (150) is connected to a reference voltage Vref, a second terminal of the power transistor turn-on trigger signal and frequency regulation control module (150) is connected to the output port of the output feedback module (120), a third terminal of the power transistor turn-on trigger signal and frequency regulation control module (150) is connected to a first terminal of the constant current control module (151), a fourth terminal of the power transistor turn-on trigger signal and frequency regulation control module (150) is connected to an S terminal of the RS flip-flop (155), a second terminal of the constant current control module (151) is connected to a non-inverting terminal of the turn-off trigger signal comparator (154) and the source of the power transistor (140), a third terminal of the constant current control module (151) is connected to an inverting terminal of the turn-off trigger signal comparator (154), an output port of the turn-off trigger signal comparator (154) is connected to one terminal of an input port of the first OR gate (157), an output port of the first OR gate (157) is connected to an R terminal of the RS flip-flop (155), the other terminal of the input port of the first OR gate (157) is connected to an output port of the second OR gate (158), one terminal of an input port of the second OR gate (158) is connected to a fourth terminal of the constant current control module (151), the other terminal of the input port of the second OR gate (158) is connected to a fifth terminal of the constant current control module (151), a Q terminal of the RS flip-flop (155) is connected to an input port of the driving module (156), and an output port of the driving module (156) is connected to the gate of the power transistor (140).

7. The control circuit for two-stage current limiting of peak power current according to claim 6, wherein the constant current control module (151) comprises a voltage dividing unit (210), a first selector (220), a second selector (230), an average current calculating unit (240), a first timer (250), a second timer (260), an operational amplifier OP1, an operational amplifier OP2, a comparator CMP1, a comparator CMP2, a capacitor C1, and a capacitor C2, wherein an output port of the voltage dividing unit (210) is connected to one terminal of an input port of the first selector (220), the other terminal of the input port of the first selector (220) is connected to a reference voltage VCS_min, an output port of the first selector (220) is connected to a non-inverting terminal of the comparator CMP1, a non-inverting terminal of the comparator CMP2 and a first terminal of an input port of the second selector (230), a second terminal of the input port of the second selector (230) is connected to a reference voltage VCS_max, a third terminal of the input port of the second selector (230) is connected to an inverting terminal of the comparator CMP2, one terminal of the capacitor C2 and an output port of the operational amplifier OP2, the other terminal of the capacitor C2 is grounded, a non-inverting terminal of the operational amplifier OP2 is connected to a reference voltage $Vref_{CC2}$, an inverting terminal of the operational amplifier OP2 is connected to an output port of the average current calculating unit (240) and an inverting terminal of the operational amplifier OP1, a non-inverting terminal of the operational amplifier OP1 is connected to a reference voltage $Vref_{CC1}$, an output port of the operational amplifier OP1 is connected to one terminal of the capacitor C1 and an inverting terminal of the comparator CMP1, the other terminal of the capacitor C1 is grounded, an output port of the comparator CMP1 is connected to an input port of the second timer (260), an input port of the voltage dividing unit (210) is the first terminal of the constant current control module (151), an input port of the average current calculating unit (240) is the second terminal of the constant current control module (151), an output port of the second selector (230) is the third terminal of the constant current control module (151), an output port of the second timer (260) is the fourth terminal of the constant current control module (151), an output port of the first timer (250) is the fifth terminal of the constant current control module (151), and an output port of the comparator CMP2 is connected to an input port of the first timer (250).

8. The control circuit for two-stage current limiting of peak power current according to claim 6, wherein the output feedback module (120) comprises a resistor R1 and a resistor R2, wherein one terminal of the resistor R1 is connected to one terminal of the second output port of the transformer (110), the other terminal of the resistor R1 is connected to the resistor R2 and the second input port of the switching power supply control unit (100), and the other terminal of the resistor R2 is grounded.

\* \* \* \* \*